(12) United States Patent
Yamamoto

(10) Patent No.: US 10,710,661 B2
(45) Date of Patent: Jul. 14, 2020

(54) GRIP HEATER DEVICE

(71) Applicant: KAWASAKI JUKOGYO KABUSHIKI KAISHA, Kobe-shi, Hyogo (JP)

(72) Inventor: Tomo Yamamoto, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 230 days.

(21) Appl. No.: 16/052,076

(22) Filed: Aug. 1, 2018

(65) Prior Publication Data

US 2019/0071145 A1    Mar. 7, 2019

(30) Foreign Application Priority Data

Sep. 5, 2017  (JP) ................. 2017-170482

(51) Int. Cl.
*B62J 33/00*    (2006.01)
*H05B 1/02*    (2006.01)
*B62K 21/26*    (2006.01)
*B62K 23/02*    (2006.01)
*B62K 11/14*    (2006.01)
*B62J 50/20*    (2020.01)
*B62K 23/04*    (2006.01)

(52) U.S. Cl.
CPC ............... *B62J 33/00* (2013.01); *B62K 11/14* (2013.01); *B62K 21/26* (2013.01); *B62K 23/02* (2013.01); *B62J 50/20* (2020.02); *B62K 23/04* (2013.01)

(58) Field of Classification Search
CPC ........... B62J 33/00; B62J 50/20; B62K 11/14; B62K 21/26; B62K 23/02; B62K 23/04; H05B 1/0236; H05B 3/0042
USPC .......................... 219/204, 202, 494, 497, 506
See application file for complete search history.

(56) References Cited

U.S. PATENT DOCUMENTS

| 7,064,292 B1 | 6/2006 | Oishi et al. |
| 7,214,906 B1 | 5/2007 | Hansen et al. |
| 2005/0173406 A1* | 8/2005 | Kurumagawa ........... B62J 33/00 219/482 |

(Continued)

FOREIGN PATENT DOCUMENTS

| CN | 1840414 A | 10/2006 |
| JP | 5701369 B1 | 4/2015 |

*Primary Examiner* — Mark H Paschall
(74) *Attorney, Agent, or Firm* — Alleman Hall Creasman & Tuttle LLP

(57) ABSTRACT

A grip heater device includes a display unit provided at a grip and including a first light source and a second light source, and a controller including an electric power control section which controls an amount of electric power to be supplied to the heater in response to an operation of a temperature adjustment member, and a light source control section which controls the first light source and the second light source. The display unit is configured to perform: a first color display, a second color display, and a third color display. The light source control section causes the display unit to perform a temperature display with a blinking pattern corresponding to an amount of the electric power supplied to the heater, by use of the first color display, the second color display, or the third color display, in response to the operation of the temperature adjustment member.

8 Claims, 2 Drawing Sheets

(56) References Cited

U.S. PATENT DOCUMENTS

2013/0030604 A1* 1/2013 Ohshima .............. B62K 11/14
701/1
2019/0256161 A1* 8/2019 Dobrinin ............... B62J 33/00

* cited by examiner

GRIP HEATER DEVICE

CROSS-REFERENCE TO RELATED APPLICATION

This application claims priority to and the benefit of Japanese Patent Application No. 2017-170482 filed on Sep. 5, 2017, the entire disclosure of which is incorporated herein by reference.

BACKGROUND OF THE INVENTION

Field of the Invention

The present invention relates to a grip heater device used in a straddle vehicle.

Description of the Related Art

It is known that a grip containing a heater is attached on a handle bar of a straddle vehicle such as a motorcycle or a personal watercraft (PWC) so that a rider can enjoy comfortable ride even under a low-temperature state. For example, Japanese Patent No. 5701369 discloses a grip heater device in which a grip is provided with an input section for temperature adjustment and a light source for temperature display.

In the grip heater device, an abnormality of an electric current or a voltage to be supplied to a heater may occur, or an abnormality may occur in a sensor or a switch of the input section. Therefore, it is necessary to properly notify a rider that the abnormality has occurred. If an alarm display section which displays the occurrence of the abnormality is provided at a meter device, it becomes necessary to change the meter device so that the meter device is adapted to the grip heater device. This results in reduced general versatility and complex wiring. If the alarm display section is provided at a controller unit, a region to which the rider's eyes are directed is significantly shifted. This results in reduced convenience. If the alarm display section is provided at the grip, the size of the grip increases and its external appearance is degraded.

SUMMARY OF THE INVENTION

An object of the present invention is to provide a grip heater device which can realize alarm display which is convenient, improve general versatility, and simplify wiring, while preventing an increase in the size of a grip.

According to an aspect of the present invention, there is provided a grip heater device including a grip which is attached on a handle of a straddle vehicle and is gripped by a rider, the grip containing a heater therein, and a temperature adjustment member which is provided at the grip and operated by the rider to adjust a temperature of the heater, the grip heater device comprising: a display unit provided at the grip and including a first light source and a second light source which are disposed adjacently to each other, the first light source and the second light source being configured to emit light in such a way that a color of the light emitted by the first light source is different from a color of the light emitted by the second light source; and a controller including an electric power control section which controls an amount of electric power to be supplied to the heater in response to an operation of the temperature adjustment member, and a light source control section which controls the first light source and the second light source, wherein the display unit is configured to perform: a first color display in which the first light source blinks or is ON and the second light source is OFF to display a first color, a second color display in which the first light source is OFF and the second light source blinks or is ON to display a second color, and a third color display in which both of the first light source and the second light source blink or are ON to display a third color formed by mixing the first color and the second color, and wherein the light source control section causes the display unit to perform a temperature display with a blinking pattern corresponding to the amount of the electric power supplied to the heater, by use of one color display selected from the first color display, the second color display, and the third color display, in response to the operation of the temperature adjustment member.

In accordance with this configuration, since a heater function, a temperature adjustment function, a temperature display function, and the like are performed within one unit of the grip heater device. Therefore, the grip heater device is mounted on the straddle vehicle without changing the existing components of the straddle vehicle. Therefore, general versatility can be improved, and wiring between the grip heater device and the straddle vehicle can be simplified. Displays including temperature display can be performed by use of the first light source and the second light source which are provided at the grip attached on the handle of the straddle vehicle. The rider can easily see the displays. Since the three-color display is performed by use of the first light source and the second light source, the displays including the temperature display can be performed by use of the display unit with a small size. This makes it possible to prevent an increase in the size of the grip provided with the display unit. In brief, the grip heater device can realize alarm display which is easily seen by the rider, improve general versatility, and simplify wiring, while preventing an increase in the size of the grip.

In the blinking pattern of the temperature display, time of an OFF-operation of each of the first light source and the second light source may be set to be longer than a time of an ON-operation of each of the first light source and the second light source.

In this setting, the temperature display can be performed without providing the rider with oppressive feeling.

The electric power control section may shift levels of the amount of the electric power to be supplied to the heater, in a predetermined sequence, in a case where the temperature adjustment member is operated by the rider for a time shorter than a predetermined time, and the electric power control section may set the amount of the electric power to be supplied to the heater to zero, in a case where the temperature adjustment member is operated by the rider for a time longer than the predetermined time.

In accordance with this configuration, the temperature adjustment of the heater can be performed more conveniently.

The display unit may be integrated with an inner portion of the grip in a vehicle width direction.

In accordance with this configuration, the rider can easily see the temperature display and the alarm display.

The controller may include an abnormality detecting section which detects whether the grip heater device is in a normal state or an abnormal state, and in a case where the electric power is supplied to the heater and the abnormality detecting section detects the normal state, the light source control section may cause the display unit to perform a normal display by use of one color display which is selected from the first color display, the second color display, and the third color display and is not used in the temperature display, and in a case where the abnormality detecting section detects the abnormal state, the light source control section may cause the display unit to perform an alarm display by use of one color display which is selected from the first color display, the second color display, and the third color display and is not used in the normal display and the temperature display.

In accordance with this configuration, the normal display, the temperature display, and the alarm display can be performed by use of two light sources. This makes it possible to realize the grip heater device with multiple functions while preventing an increase in the size of the grip.

The light source control section may cause the display unit to perform the alarm display with a blinking pattern corresponding to a kind of an abnormality detected by the abnormality detecting section.

In accordance with this configuration, the alarm display can be performed so that the plural kinds of abnormalities can be distinguished from each other without increasing the light sources. This makes it possible to increase the kind of the alarm display, while preventing an increase in the size of the grip provided with the display unit.

The light source control section may make the blinking pattern of the alarm display different between the abnormality of the temperature adjustment member, the abnormality of a voltage applied to the heater, and the abnormality of an electric current flowing through the heater.

In accordance with this configuration, the alarm displays corresponding to the abnormalities with different kinds can be suitably performed.

One of the first light source and the second light source may have a green color and the other of the first light source and the second light source may have a red color, the light source control section may cause the display unit to perform the normal display in which the first light source blinks or is ON and the second light source is OFF, in a case where the electric power is supplied to the heater and the abnormality detecting section detects the normal state, the light source control section may cause the display unit to perform the temperature display in which both of the first light source and the second light source blink to emit the light with a mixed color, in response to the operation of the temperature adjustment member, and the light source control section may cause the display unit to perform the alarm display in which the first light source is OFF, and the second light source blinks or is ON, in a case where the abnormality detecting section detects the abnormal state.

In accordance with this configuration, the normal display, the temperature display, and the alarm display can be suitably performed.

The above and further objects, features, and advantages of the present invention will more fully be apparent from the following detailed description of preferred embodiment with reference to accompanying drawings.

DETAILED DESCRIPTION OF THE EMBODIMENTS

Hereinafter, the embodiment will be described with reference to the drawings. The stated directions are from the perspective of a rider straddling a straddle vehicle.

Figure 1:
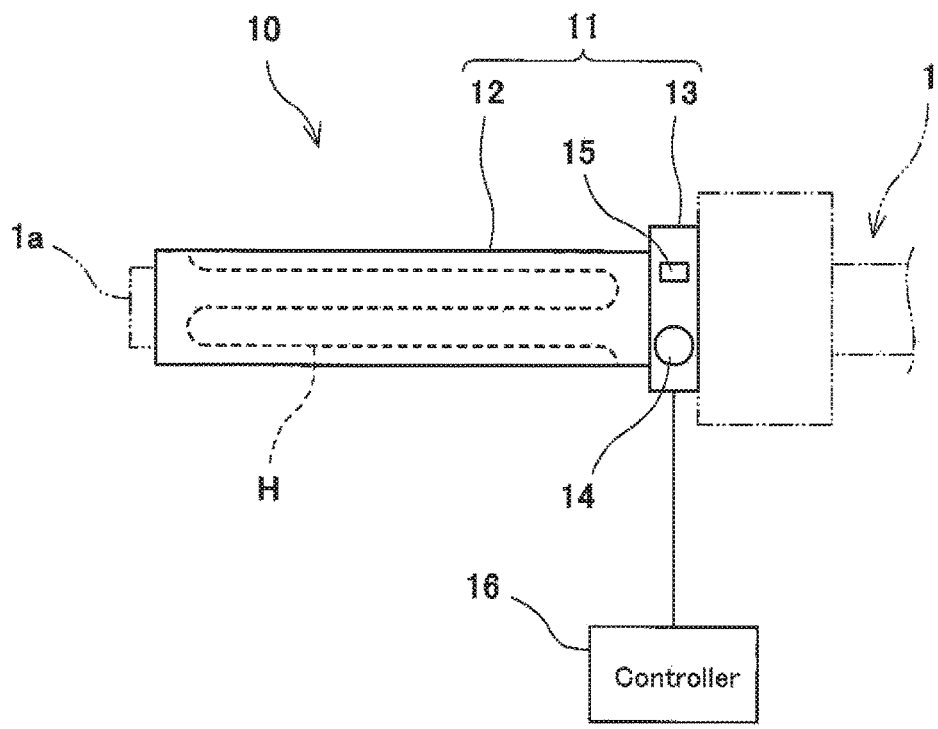
FIG. 1 is a schematic view of a grip heater device according to an embodiment.

FIG. 1 is a schematic view of a grip heater device 10 according to the embodiment. As shown in FIG. 1, the grip heater device 10 is attached on a handle bar 1 of a straddle vehicle such as a motorcycle. The grip heater device 10 includes a tubular grip 11 which is fittable to a bar part 1a of the handle bar 1. The grip 11 includes a grip body 12 which can be gripped by the rider's hand, and a grip base end part 13 which is provided at a location that is inward of the grip body 12 in a vehicle width direction and is adjacent to the grip body 12. The grip base end part 13 is integrated with the grip body 12, and has a diameter larger than that of the grip body 12. The grip body 12 contains therein a heater H which generates heat by electric power supplied to the heater H.

The grip base end part 13 is provided with a temperature adjustment button 14 (temperature adjustment member) which is operated by the rider to adjust the temperature of the heater H, and a display unit 15 which performs displays by light emission to the rider. In the present embodiment, one temperature adjustment button 14 is provided, and one display unit 15 is provided. A controller 16 is connected to the grip 11. The controller 16 is mounted on a vehicle body at a location that is distant from the grip 11. Electric power is supplied from a power supply such as a battery mounted in the straddle vehicle to the grip 11 and the controller 16 via wires which are not shown.

Figure 2:
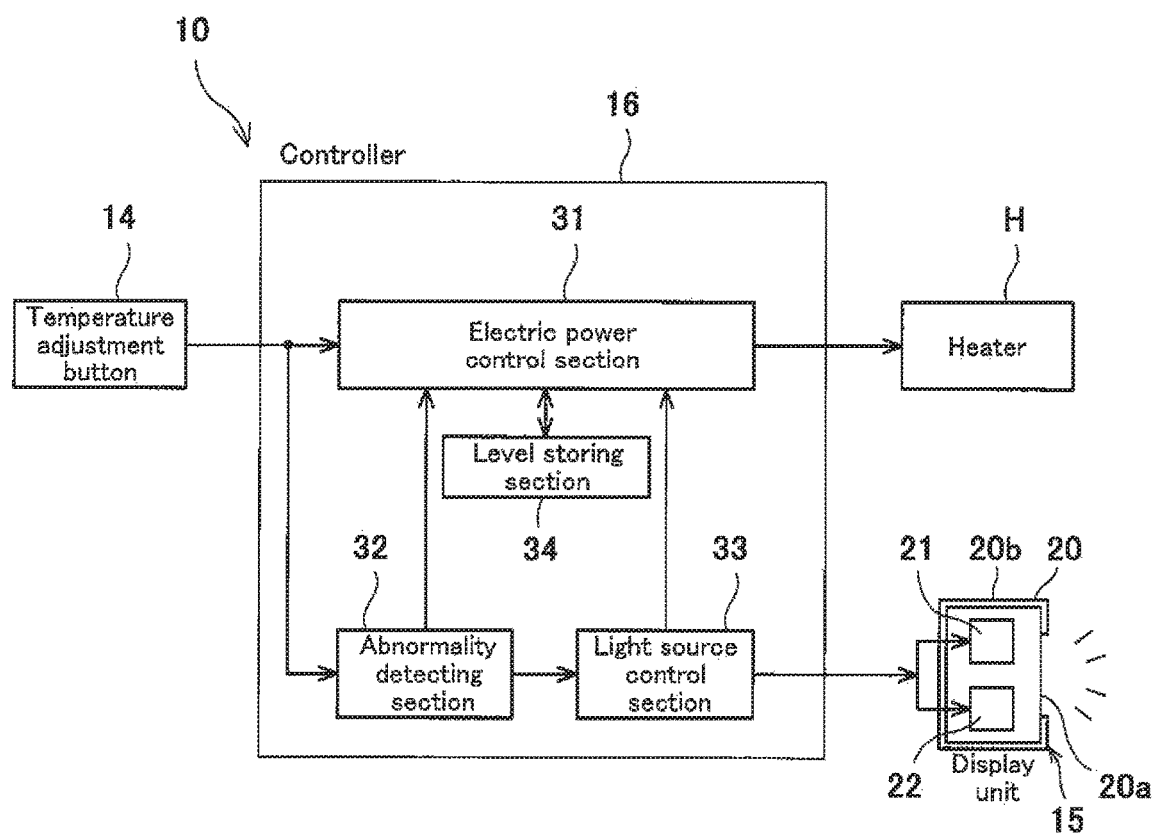
FIG. 2 is a block diagram of the grip heater device of FIG. 1.

FIG. 2 is a block diagram of the grip heater device 10 of FIG. 1. Referring to FIG. 2, the controller 16 controls supply/non-supply of the electric power to the heater H, the amount of the electric power to be supplied to the heater H, and the display unit 15, in response to the command from the temperature adjustment button 14. The display unit 15 includes a casing 20 including a light transmission section 20a and a non-light-transmission section 20b, a first LED 21 (first light source) accommodated in the casing 20, and a second LED 22 (second light source) accommodated in the casing 20. The display unit 15 does not include a light source other than the first LED 21 and the second LED 22.

The light transmission section 20a is comprised of a transparent member or a translucent member. The light transmission section 20a is disposed on a surface of the grip base end part 13, the surface facing the rider. The non-light-transmission section 20b is comprised of a non-transparent member. A reflective layer such as an aluminum layer may be provided on an inner surface of the non-light-transmission section 20b, the inner surface facing the first LED 21 and the second LED 22. The first LED 21 and the second LED 22 are disposed to be adjacent to each other inside the casing 20. The first LED 21 and the second LED 22 are configured to emit light such that the color of the light emitted by the first LED 21 is different from the color of the light emitted by the second LED 22 In the present embodiment, the first LED 21 emits the light with a green color, and the second LED 22 emits the light with a red color. The first LED 21 and the second LED 22 may emit the light with colors which are other than the green color and the red color.

The controller 16 includes an electric power control section 31, an abnormality detecting section 32, a light source control section 33, and a level storing section 34. The controller 16 includes a processor, a volatile memory, a non-volatile memory, an IO interface, and the like. The electric power control section 31, the abnormality detecting section 32, and the light source control section 33 are implemented in such a manner that the processor performs calculations (computations) by use of the volatile memory based on programs stored in the non-volatile memory. The level storing section 34 is implemented by the non-volatile memory or the volatile memory.

The electric power control section 31 controls the amount of the electric power to be supplied to the heater H in response to the rider's operation for pressing (pushing) the temperature adjustment button 14. For example, every time the pressing operation for a specified time (pressing operation for a short time) which is shorter than a predetermined time (e.g., 2 seconds) occurs, the electric power control section 31 controls the amount of the electric power to be supplied to the heater H according to a sequence in which the operation of the heater H shifts, in the order of OFF→temperature level 3 (strong)→temperature level 2 (medium)→temperature level 1 (weak)→OFF. As the amount of the electric power to be supplied to the heater H is increased, the temperature of the heater H becomes higher. Therefore, the electric power control section 31 controls the amount of the electric power to be supplied to the heater H so that the amount of the electric power is more as a desired temperature level is higher. Specifically, the electric power control section 31 controls the amount of the electric power to be supplied to the heater H so that the amount of the electric power corresponding to the temperature level "strong" is more than the amount of the electric power corresponding to the temperature level "medium", and the amount of the electric power corresponding to the temperature level "medium" is more than the amount of the electric power corresponding to the temperature level "weak". Alternatively, the sequence may be set in the order of OFF→temperature level 1 (weak)→temperature level 2 (medium)→temperature level 3 (strong)→OFF. In a case where the pressing operation for a specified time (pressing operation for a long time) which is longer than the predetermined time (e.g., 2 seconds) occurs, the electric power control section 31 turns OFF the heater H (sets the amount of the electric power to be supplied to the heater H to zero), irrespective of a present operating state of the heater H.

The abnormality detecting section 32 detects whether the grip heater device 10 is in a normal state or an abnormal state. The abnormality detecting section 32 is able to detect that an abnormality has occurred in a switch provided at the temperature adjustment button 14 to send ON/OFF signal to the controller 16. For example, in a case where the ON signal continues for a time longer than a predetermined upper limit time (e.g., 30 seconds), the abnormality detecting section 32 determines that an abnormality has occurred in which the switch continues to be incapable of operation For example, in a case where the voltage applied to the heater H falls outside a predetermined permissible range, the abnormality detecting section 32 determines that a voltage abnormality has occurred. Also, in a case where the electric current flowing through the heater H falls outside a predetermined permissible range, the abnormality detecting section 32 determines that an electric current abnormality has occurred.

The light source control section 33 controls ON/blinking (flashing)/OFF of each of the first LED 21 and the second LED 22. The light source control section 33 controls the first LED 21 and the second LED 22 depending on the control state of the electric power control section 31. The light source control section 33 also controls the first LED 21 and the second LED 22 depending on the detection state of the abnormality detecting section 32. The specific content of the control performed by the light source control section 33 will be described later.

The level storing section 34 stores therein which level in the sequence (OFF, temperature level 3, temperature level 2, or temperature level 1) the level of the control performed by the electric power control section 31 is set to, at a present time point. The data stored in the level storing section 34 is deleted when a main power supply of the straddle vehicle is OFF. Alternatively, the data may continue to be stored in the level storing section 34, even after the main power supply of the straddle vehicle is OFF.

Figure 3:
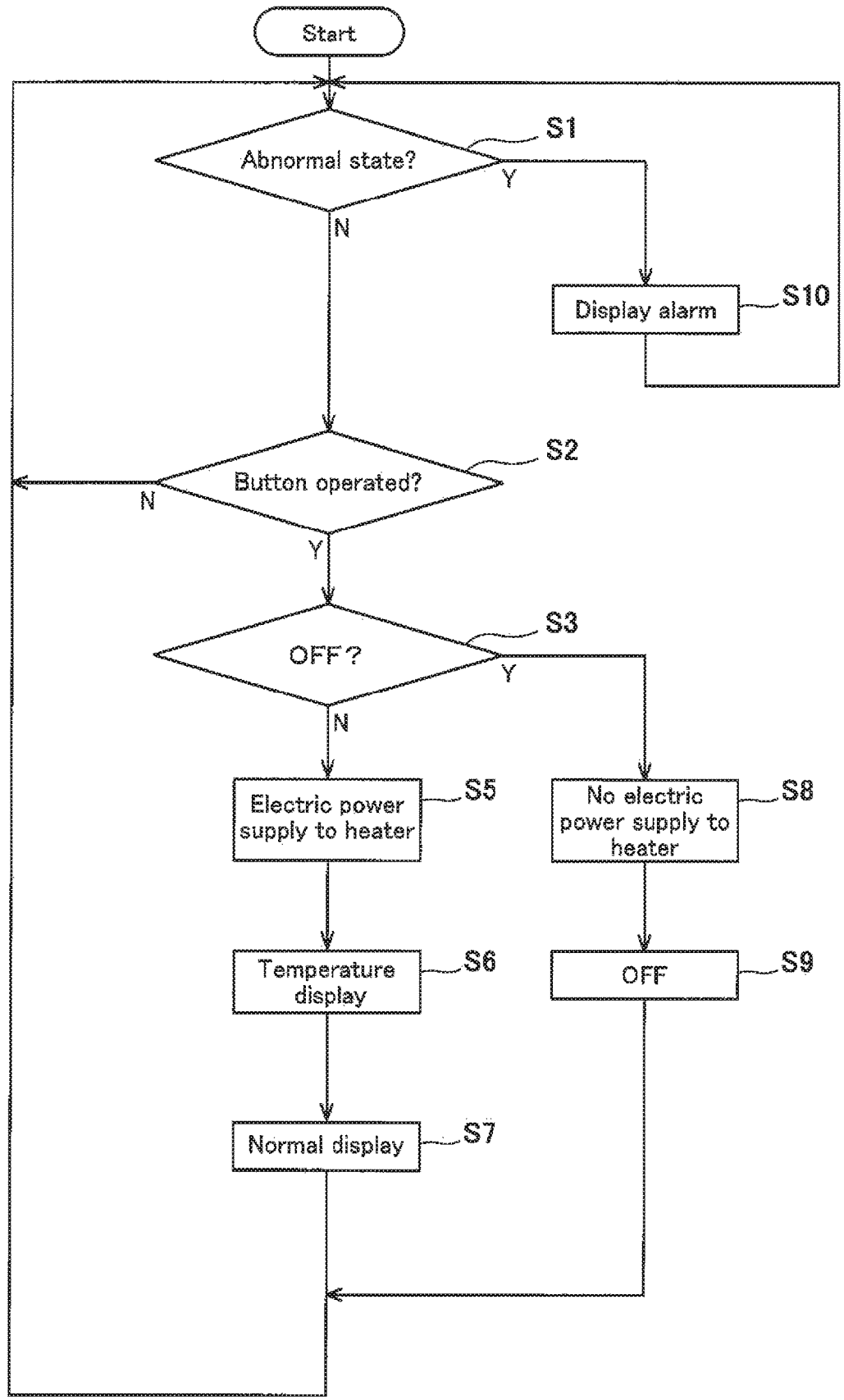
FIG. 3 is a flowchart showing the operation of the grip heater device of FIG. 2.

FIG. 3 is a flowchart showing the operation of the grip heater device 10 of FIG. 2. Hereinafter, the operation of the grip heater device 10 will be described along the flow of FIG. 3, with reference to FIG. 2.

Initially, when the straddle vehicle is activated and the electric power is supplied to the controller 16 or the like, the abnormality detecting section 32 determines whether or not the grip heater device 10 is in an abnormal state (step S1). In a case where the abnormality detecting section 32 determines that there is no abnormality in the grip heater device 10 (step S1: NO), the electric power control section 31 determines whether or not the temperature adjustment button 14 has been pressed (pushed) by the rider (step S2). In a case where the electric power control section 31 determines that the temperature adjustment button 14 has been pressed (pushed) by the rider (step S2: YES), the electric power control section 31 determines whether or not the pressing (pushing) operation is an OFF operation (step S3).

Specifically, in a case where the pressing operation of the temperature adjustment button 14 is not the long-time pressing operation and is the short-time pressing operation and the operation of the heater H at next time in the sequence is not the OFF operation, the electric power control section 31 determines that this pressing operation is not the OFF operation (step S3: NO), and supplies the electric power to the heater H. In a case where the pressing operation is an initial operation after the start-up, the temperature level is not stored in the level storing section 34 and the heater H is OFF. Therefore, the electric power control section 31 sets the amount of the electric power to be supplied to the heater H so that the temperature level becomes the temperature level 3 (strong) according to the above-described sequence (step S5). Note that the electric power control section 31 reduces the amount of the electric power to be supplied to the heater H as the temperature level is lower in the order of temperature level 3 (strong)→temperature level 2 (medium)→temperature level 1 (weak).

The light source control section 33 causes the display unit 15 to perform the temperature display according to the content of the control performed by the electric power control section 31 (step S6). The display unit 15 performs the temperature display in such a manner that both of the first LED 21 and the second LED 22 emit the light. In this case, the green color of the first LED 21 and the red color of the second LED 22 are mixed, and the light of a yellow color is emitted. Then, the light source control section 33 causes the first LED 21 and the second LED 22 to blink at the same time with a blinking pattern which is different between the temperature levels.

For example, in a first temperature blinking pattern corresponding to the temperature level 1 (weak), the OFF-operation is performed once for a long time with respect to the ON-operation performed once. Specifically, in the first temperature blinking pattern, time t1 of the ON-operation is shorter than time t2 of the OFF-operation. In a second temperature blinking pattern corresponding to the temperature level 2 (medium), the OFF-operation is performed once for a long time with respect to the blinking operation including the ON-operation performed twice. Specifically, in the second temperature blinking pattern, the time t1 of each of the ON-operation and the OFF-operation within the blinking operation including the ON-operation performed twice and the OFF-operation performed once is shorter than OFF-time t2 between the blinking operations. In a third temperature blinking pattern corresponding to the temperature level 3 (strong), the OFF-operation is performed once for a long time with respect to the blinking operation including the ON-operation performed three times. In the third temperature blinking pattern, time t1 of each of the ON-operation and the OFF-operation within the blinking operation including the ON-operation performed three times and the OFF-operation performed twice is shorter than OFF-time t2 between the blinking operations.

In a case where switching between the temperature levels 1 to 3 occurs, the light source control section 33 causes the first LED 21 and the second LED 22 to blink so that the corresponding blinking pattern, of the first to third blinking patterns, is repeated a predetermined number of times (e.g., five times), and then causes the display unit 15 to perform a normal display (step S7). In the normal display, the first LED 21 is ON and the second LED 22 is OFF. Thus, the display unit 15 emits the light with the green color. This normal display is continued until the heater H is turned OFF or the temperature level is switched.

In a case where the electric power control section 31 determines that the pressing operation of the temperature adjustment button 14 is the OFF operation in step S3 (step S3: YES), the electric power control section 31 ceases to supply the electric power to the heater H (step S8). Then, the light source control section 33 causes the first LED 21 and the second LED 22 to be OFF, and causes the display unit 15 to display that the heater H is OFF (deactivated) (step S9).

After step S7 and step S9, the process returns to step S1. In a case where the abnormality detecting section 32 determines that there is an abnormality in the grip heater device 10 (step S1: YES), the light source control section 33 causes the display unit 15 to perform alarm display (step S10). In the alarm display, the first LED 21 is OFF and the second LED 22 blinks. Thus, the display unit 15 emits the light with the red color.

The light source control section 33 causes the second LED 22 to blink in a blinking pattern which is different between abnormalities detected by the abnormality detecting section 32. For example, in a first alarm blinking pattern corresponding the voltage abnormality, the OFF-operation is performed once with respect to the ON-operation performed once. Time of the ON-operation is equal to or longer than time of the OFF-operation.

For example, in a second alarm blinking pattern corresponding the electric current abnormality, the OFF-operation is performed once with respect to the ON-operation performed once. Time of the ON-operation is equal to or longer than time of the OFF-operation. Time t4 of the ON-operation and time t4 of the OFF-operation are longer than the time t3 of the ON-operation and the time t3 of the OFF-operation, respectively, of the first alarm blinking pattern (t4<t3).

For example, in a third alarm blinking pattern corresponding an abnormality of the temperature adjustment button 14 (abnormality of switch), the OFF-operation is performed once with respect to the ON-operation performed once. Time of the ON-operation is equal to or longer than time of the OFF-operation. Time t5 of the ON-operation of the third alarm blinking pattern is longer than the ON-time t3 of the first alarm blinking pattern and shorter than the ON-time t4 of the second alarm blinking pattern. Time t6 of the OFF-operation of the third alarm blinking pattern is shorter than the OFF-time t3 of the first alarm blinking pattern, and the OFF-time t4 of the second alarm blinking pattern.

In the first to third temperature blinking patterns, the OFF-time t2 is set longer than the ON-time t1. In the first to third alarm blinking patterns, the OFF-time t3, the OFF-time t4, and the OFF-time t6 are set to be equal to or shorter than the ON-time t3, the ON-time t4, and the ON-time t5, respectively. Note that cycle times of the first to third alarm blinking patterns are set to be equal to each other, in the present embodiment.

The alarm display corresponding to the alarm blinking pattern is continued until the electric power supply to the grip heater device 10 is cut-off, once the alarm display is initiated. If plural kinds of abnormalities have occurred in the grip heater device 10 at the same time, the alarm blinking patterns corresponding to these abnormalities are alternately repeated. In a case where an error of control programs occurs at the start-up of the controller 16, both of the first LED 21 and the second LED 22 are turned ON all the time, and thus the display unit 15 emits the light with the yellow color to display a program error.

In accordance with the above-described configuration, a heater function, a temperature adjustment function, a temperature display function, and an alarm display function are performed within one unit of the grip heater device 10. Therefore, the grip heater device 10 is mounted on the straddle vehicle without changing the existing components of the straddle vehicle. Therefore, general versatility can be improved, and wiring between the grip heater device 10 and the straddle vehicle can be simplified.

The temperature display and the alarm display can be performed by use of the first LED 21 and the second LED 22 provided at the grip 11 attached on the handle 1 of the straddle vehicle. The rider can easily see the temperature display and the alarm display. Since the three-color display is performed by use of the first LED 21 and the second LED 22, the normal display, the temperature display and the alarm display can be performed by the display unit 15 with a small size. This makes it possible to prevent an increase in the size of the grip 11 provided with the display unit 15.

As described above, the grip heater device 10 can realize good alarm display which is easily seen by the rider, improve general versatility, and simplify the wiring, while preventing an increase in the size of the grip 11.

Since the controller 16 causes the display unit 15 to perform the alarm display with the blinking pattern corresponding to the abnormality detected by the abnormality detecting section 32, the alarm display can be performed so that the plural kinds of abnormalities can be distinguished from each other, without increasing LEDs. This makes it possible to increase the kind of the alarm display while preventing an increase in the size of the grip 11 provided with the display unit 15.

In each temperature blinking pattern of the temperature display, since the OFF-time t2 is longer than the ON-time t1, the temperature display can be performed without providing the rider with oppressive feeling. Since the display unit 15 is integrated with the inner portion of the grip 11 in the vehicle width direction, the rider can more easily see the temperature display and the alarm display.

The present invention is not limited to the above-described embodiment, and the configuration can be changed, added or deleted. For example, although in the above-described embodiment, the first LED 21 has the green color and the second LED 22 has the red color, the first LED 21 and the second LED 22 may have other colors so long as a third color can be displayed by mixing the colors of the first LED 21 and the second LED 22. For example, the first LED 21 may have a blue color and the second LED 22 may have the red color, and these colors may be mixed into magenta. The first LED 21 may have the blue color and the second LED 22 may have the green color, and these colors may be mixed into cyan. Although in the above-described embodiment, the LEDs are used as the light sources of the display unit 15, other light sources may be used. The above-described blinking operation may be changed into the ON-operation. Or, the ON-operation may be changed into the blinking operation.

In the above-described temperature blinking patters, the ON-times t1 are equal to each other and the OFF-times t2 are equal to each other, the ON-times t1 may be different from each other and the OFF-times t2 may be different from each other. Although the cycles times of the alarm blinking patters are equal to each other, they may be different from each other. The temperature levels are not limited to the three levels, and may be one level, two levels, or four or levels. Although one temperature adjustment button 14 is provided, a temperature increasing button and a temperature decreasing button may be separately provided.

The invention claimed is:

1. A grip heater device including a grip which is attached on a handle of a straddle vehicle and is gripped by a rider, the grip containing a heater therein, and a temperature adjustment member which is provided at the grip and operated by the rider to adjust a temperature of the heater, the grip heater device comprising:
   a display unit provided at the grip and including a first light source and a second light source which are disposed adjacently to each other, the first light source and the second light source being configured to emit light in such a way that a color of the light emitted by the first light source is different from a color of the light emitted by the second light source; and
   a controller including an electric power control section which controls an amount of electric power to be supplied to the heater in response to an operation of the temperature adjustment member, and a light source control section which controls the first light source and the second light source,
   wherein the display unit is configured to perform:
   a first color display in which the first light source blinks or is ON and the second light source is OFF to display a first color,
   a second color display in which the first light source is OFF and the second light source blinks or is ON to display a second color, and
   a third color display in which both of the first light source and the second light source blink or are ON to display a third color formed by mixing the first color and the second color, and
   wherein the light source control section causes the display unit to perform a temperature display with a blinking pattern corresponding to the amount of the electric power supplied to the heater, by use of one color display selected from the first color display, the second color display, and the third color display, in response to the operation of the temperature adjustment member.

2. The grip heater device according to claim 1, wherein in the blinking pattern of the temperature display, time of an OFF-operation of each of the first light source and the second light source is longer than a time of an ON-operation of each of the first light source and the second light source.

3. The grip heater device according to claim 1, wherein the electric power control section shifts levels of the amount of the electric power to be supplied to the heater, in a predetermined sequence, in a case where the temperature adjustment member is operated by the rider for a time shorter than a predetermined time, and wherein the electric power control section sets the amount of the electric power to be supplied to the heater to zero, in a case where the temperature adjustment member is operated by the rider for a time longer than the predetermined time.

4. The grip heater device according to claim 1, wherein the display unit is integrated with an inner portion of the grip in a vehicle width direction.

5. The grip heater device according to claim 1, wherein the controller includes an abnormality detecting section which detects whether the grip heater device is in a normal state or an abnormal state,
   wherein in a case where the electric power is supplied to the heater and the abnormality detecting section detects the normal state, the light source control section causes the display unit to perform a normal display by use of one color display which is selected from the first color display, the second color display, and the third color display and is not used in the temperature display, and
   wherein in a case where the abnormality detecting section detects the abnormal state, the light source control section causes the display unit to perform an alarm display by use of one color display which is selected from the first color display, the second color display, and the third color display and is not used in the normal display and the temperature display.

6. The grip heater device according to claim 5, wherein the light source control section causes the display unit to perform the alarm display with a blinking pattern corresponding to a kind of an abnormality detected by the abnormality detecting section.

7. The grip heater device according to claim 6, wherein the light source control section makes the blinking pattern of the alarm display different between the abnormality of the temperature adjustment member, the abnormality of a voltage applied to the heater, and the abnormality of an electric current flowing through the heater.

8. The grip heater device according to claim 5, wherein one of the first light source and the second light source has a green color and the other of the first light source and the second light source has a red color,
   wherein in a case where the electric power is supplied to the heater and the abnormality detecting section detects the normal state, the light source control section causes the display unit to perform the normal display in which the first light source blinks or is ON and the second light source is OFF,
   wherein the light source control section causes the display unit to perform the temperature display in which both of the first light source and the second light source blink to emit the light with a mixed color, in response to the operation of the temperature adjustment member, and
   wherein in a case where the abnormality detecting section detects the abnormal state, the light source control section causes the display unit to perform the alarm display in which the first light source is OFF, and the second light source blinks or is ON.

\* \* \* \* \*